(12) United States Patent
Finch

(10) Patent No.: US 7,958,050 B2
(45) Date of Patent: Jun. 7, 2011

(54) PAYMENT ACCOUNT MONITORING SYSTEM AND METHOD

(75) Inventor: Paul Finch, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

(21) Appl. No.: 11/772,604

(22) Filed: Jul. 2, 2007

(65) Prior Publication Data

US 2009/0012889 A1    Jan. 8, 2009

(51) Int. Cl.
*G06Q 40/00* (2006.01)
(52) U.S. Cl. .................. 705/40; 705/35; 705/39
(58) Field of Classification Search .......... 705/35, 705/39, 40
See application file for complete search history.

(56) References Cited

U.S. PATENT DOCUMENTS

| | | | |
|---|---|---|---|
| 5,175,682 A | 12/1992 | Higashiyama et al. | |
| 5,265,007 A | 11/1993 | Barnhard, Jr. et al. | |
| 5,355,413 A | 10/1994 | Ohno | |
| 5,404,488 A | 4/1995 | Kerrigan et al. | |
| 5,679,938 A | 10/1997 | Templeton et al. | |
| 5,679,940 A | 10/1997 | Templeton et al. | |
| 5,819,236 A | 10/1998 | Josephson | |
| 5,832,463 A | 11/1998 | Funk | |
| 5,832,464 A | 11/1998 | Houvener et al. | |
| 5,920,848 A * | 7/1999 | Schutzer et al. | 705/42 |
| 5,966,698 A * | 10/1999 | Pollin | 705/34 |
| 5,983,380 A | 11/1999 | Motika et al. | |
| 6,085,168 A | 7/2000 | Mori et al. | |
| 6,119,103 A | 9/2000 | Basch et al. | |
| 6,189,785 B1 | 2/2001 | Klowery | |
| 6,351,735 B1 | 2/2002 | Deaton et al. | |
| 6,442,714 B1 | 8/2002 | Griffin et al. | |
| 6,496,936 B1 | 12/2002 | French et al. | |
| 6,622,270 B2 | 9/2003 | Beffa | |
| 6,629,081 B1 | 9/2003 | Cornelius et al. | |
| 6,647,376 B1 | 11/2003 | Farrar et al. | |
| 6,754,640 B2 | 6/2004 | Bozeman | |
| 6,873,974 B1 * | 3/2005 | Schutzer | 705/41 |
| 7,004,382 B2 | 2/2006 | Sandru | |
| 7,165,051 B2 | 1/2007 | Ronning et al. | |
| 7,177,846 B2 | 2/2007 | Moenickheim et al. | |
| 7,231,657 B2 | 6/2007 | Honarvar et al. | |
| 7,337,953 B2 | 3/2008 | Sgambati et al. | |
| 7,512,221 B2 | 3/2009 | Toms | |
| 7,539,644 B2 | 5/2009 | Hu et al. | |

(Continued)

OTHER PUBLICATIONS

Experian's Collection Triggers: "Experian Launches Collections Solution to Monitor, Locate, and Collect Unpaid Receivables" Feb. 11, 2006 & "Collection Triggers SM" Feb. 2007.*

(Continued)

*Primary Examiner* — Hani Kazimi
*Assistant Examiner* — John D Scarito
(74) *Attorney, Agent, or Firm* — Kilpatrick Townsend & Stockton LLP

(57) ABSTRACT

A network includes an account status system for checking the status of checking accounts used to make payments, and a payment account monitoring system that includes linking files that store, for individual credit card accounts, the account numbers for checking accounts used to pay the credit card accounts. The monitoring system periodically retrieves checking account numbers from the linking files and checks the account numbers at the status system. If a negative status is indicated at the status system, an alert is provided to the credit card company.

31 Claims, 2 Drawing Sheets

U.S. PATENT DOCUMENTS

| | | | |
|---|---|---|---|
| 2002/0016763 A1* | 2/2002 | March | 705/39 |
| 2002/0019827 A1 | 2/2002 | Shiman et al. | |
| 2002/0026396 A1 | 2/2002 | Dent et al. | |
| 2002/0046341 A1 | 4/2002 | Kazaks et al. | |
| 2002/0052852 A1 | 5/2002 | Bozeman | |
| 2002/0065784 A1 | 5/2002 | Ranzini et al. | |
| 2002/0103756 A1 | 8/2002 | Andrews et al. | |
| 2002/0120506 A1 | 8/2002 | Hagen | |
| 2002/0120846 A1* | 8/2002 | Stewart et al. | 713/168 |
| 2002/0144187 A1 | 10/2002 | Morgan et al. | |
| 2002/0178112 A1 | 11/2002 | Goeller et al. | |
| 2003/0050986 A1 | 3/2003 | Matthews et al. | |
| 2003/0115189 A1 | 6/2003 | Srinivasa et al. | |
| 2003/0115470 A1 | 6/2003 | Cousins et al. | |
| 2003/0130919 A1* | 7/2003 | Templeton et al. | 705/35 |
| 2003/0138084 A1 | 7/2003 | Lynam et al. | |
| 2003/0149660 A1 | 8/2003 | Canfield | |
| 2003/0187786 A1 | 10/2003 | Swift et al. | |
| 2003/0187796 A1 | 10/2003 | Swift et al. | |
| 2003/0200118 A1 | 10/2003 | Lee et al. | |
| 2003/0216934 A1* | 11/2003 | Pfoertner | 705/1 |
| 2003/0217003 A1 | 11/2003 | Weinflash et al. | |
| 2004/0019564 A1 | 1/2004 | Goldthwaite et al. | |
| 2004/0064401 A1 | 4/2004 | Palaghita et al. | |
| 2004/0098339 A1 | 5/2004 | Malek et al. | |
| 2004/0122769 A1* | 6/2004 | Bailo et al. | 705/42 |
| 2004/0153403 A1 | 8/2004 | Sadre | |
| 2004/0153514 A1 | 8/2004 | Crane | |
| 2004/0153663 A1 | 8/2004 | Clark et al. | |
| 2004/0191746 A1 | 9/2004 | Maron et al. | |
| 2004/0236692 A1 | 11/2004 | Sellen et al. | |
| 2005/0021476 A1 | 1/2005 | Candella et al. | |
| 2005/0033695 A1 | 2/2005 | Minowa | |
| 2005/0055296 A1* | 3/2005 | Hattersley et al. | 705/35 |
| 2005/0075977 A1* | 4/2005 | Carroll et al. | 705/40 |
| 2005/0125360 A1 | 6/2005 | Tidwell et al. | |
| 2005/0131816 A1* | 6/2005 | Britto et al. | 705/39 |
| 2005/0234820 A1* | 10/2005 | MacKouse | 705/40 |
| 2006/0224470 A1 | 10/2006 | Garcia Ruano et al. | |
| 2006/0271457 A1 | 11/2006 | Romain et al. | |
| 2007/0106558 A1* | 5/2007 | Mitchell et al. | 705/16 |
| 2007/0198361 A1 | 8/2007 | Ronning et al. | |
| 2007/0198403 A1* | 8/2007 | Aloni et al. | 705/39 |
| 2007/0288641 A1 | 12/2007 | Lee et al. | |
| 2008/0027865 A1 | 1/2008 | Usui et al. | |
| 2008/0046368 A1 | 2/2008 | Tidwell et al. | |

OTHER PUBLICATIONS

Early Warning Website: "Remittance Risk Service" viewed at http://web.archive.org/web/20060620040233/early-warning.com/remittancerisk/ & "Payment Risk Service" viewed at http://web.archive.org/web/20060619213717/early-warning.com/paymentrisk/ & "Deposit Check" viewed at http://web.archive.org/web/20060620040200/early-warning.com/depositchek.*

Experian's Collection Triggers: "Experian Launches Collections Solution to Monitor, Locate, and Collect Unpaid Receivables" Feb. 11, 2006 & "Collection Triggers SM" Feb. 2007.*

Experian's Collection Triggers: "Experian Launches Collections Solution to Monitor, Locate, and Collect Unpaid Receivables" Feb. 11, 2006 & "Collection Triggers SM" Feb. 2007.*

"BB&T, Star Systems and International Check Services Successfully Complete First Safecheck Transactions," News Release dated Aug. 24, 2000, printout from website http://www.intlcheck.com/pages/pressre/20000824.html, 2 pages, printout Mar. 4 2002.

"About ChexSystems," website: http://www.chexhelp.com/English/public.htm, 1 page, printout date: Mar. 8, 2002.

"About SCANSM," printout from website: http://www.scanassist.com/about.html, 1 page, printout date: Mar. 8, 2002.

"CheckAGAIN Adds ECHO's NCIS Database to Service," News Release from ECHO, 1 page, March 27, 2001.

"CheckAGAIN Adds Leading National Authorization Database to Services," News Release dated Jan. 30, 2001, printout from CheckAGAIN, LLC website: http://www.checkagain.com/press010301.asp, 2 pages, printout date: Mar. 8, 2002.

"ChexSystems and Deluxe Corp.," printout from CardReport website: http://www.cardreport.com/overview/bureaus/chexsystems,htm, 3 pages, printout date: March 8, 2002.

"Compliance with Regulation CC," printout from The Federal Reserve Board website: http://www.federalreserve.gov/pubs/regcc/regcc/htm, last update of website page: Jul. 25, 2001, 6 pages, printout date: Apr. 18, 2002.

"Customized Internet Solutions for Small Business People," printout from website: http://www.tconsult.com/address_verification.aspx, 3 pages, printout date: Sep. 18, 2003.

"eFunds Counts on SAS to Lower Risks for Banks and Retailers," printout from SAS website: http://www.sas.com/news/success/efunds.html, 2 pages, printout date: March 8, 2002.

"Electronic Clearing House to Power Point-of-Sale Check Service Program," Echo Press Release dated Jul. 16, 2001, printout from website: http://www.echo-inc.com/press_115.html, 3 pages, printout date: March 12, 2002.

"Financial Institution Letters, Special Alert," dated Mar. 22, 200, printout from FDIC website: http://www.fdic.gov/news/financial/2000/fil0019/html, 1 page, printout date: Mar. 8, 2002.

"Operation Gold Rush Leads to Arrest of Eight Defendants Charged in Massive Credit Card Scam that Cost Banks up to $15 Million," News Release No. 99-038 from Department of Justice, 2 pages, Feb. 23, 1999.

"SCANSM and SCAN OnLineSM," printout from eFUNDS website: http://www.efunds.com/us/en/solutions/comp_a2z/pm/001118.cnt, 1 page, printout date: Mar. 4, 2002.

"Secure Seal™—A Product Guide," EnSeal Systems Ltd., 3 pages, 2003.

"Star Chek Goes Live with Online Check Verification," News Release dated Jan. 16, 2001, Star Systems, Inc., printout from website: http://www.star-systems.com/cfm/news-press.cfm?id=42, 2 pages, printout date: Feb. 20, 2002.

"TeleCheck® Verification Services," printout from TeleCheck website: http://www.telecheck.com/products/verification.html, 1 page, printout date: Mar. 8, 2002.

"Thomson Bank InfoLink™," Thomson Financial Publishing, 2 pages, date unknown.

"Welcome to PayByCheck! The leading provider of electronic check processing," printout from PayByCheck website: http://www.paybycheck.com, 2 pages, printout date: Sep. 18, 2003.

CheckAGAIN Product Information, "Check Authorizations," printout from CheckAGAIN, LLC website: http://www.checkagain.com/authorizations.asp, 1 page, printout date: Mar. 8, 2002.

CheckAGAIN Product Information, "Centralized Returns," printout from CheckAGAIN, LLC website: http://www.checkagain.com/returns.asp, 1 page, printout date: Mar. 8, 2002.

PPS—Deposit Chek® "Deposit Chek," printout from website: http//64.78.123/dchek.htm, 2 pages, printout date: Mar. 20, 2002.

PPS—Deposit Chek® "Preventing Check Losses at Credit Unions," 2 pages, Sep. 20, 2001.

Scan Consumer Help, "Welcome to the SCANSM Consumer Assistance Center," Deposit Payment Protection Services, Inc., copyright date: 1999, printout from website: http://www.scanassist.com/scanassist.html, 1 page, printout date: March 8, 2002.

U.S. Appl. No. 10/773,642 Office Action dated Feb. 19, 2008, 17 pages.

U.S. Appl. No. 11/183,167 Advisory Action dated Jul. 29, 2008, 3 pages.

U.S. Appl. No. 11/183,167 Final Office Action dated May 19, 2008, 1 page.

U.S. Appl. No. 11/183,167 Office Action dated Dec. 11, 2007, 6 pages.

U.S. Appl. No. 11/183,167 Office Action dated Oct. 27, 2008, 8 pages.

U.S. Appl. 10/773,642 Final Office Action dated May 11, 2009, 20 pages.

U.S. Appl. 10/773,642 Office Action dated Oct. 16, 2009, 26 pages.

U.S. Appl. 10/773,642 Final Office Action dated Mar. 24, 2010, 25 pages.

U.S. Appl. 11/183,167 Final Office Action dated Jun. 11, 2009, 11 pages.
U.S. Appl. 11/183,167 Advisory Action dated Aug. 24, 2009, 3 pages.
U.S. Appl. 11/183,167 Office Action dated Nov. 19, 2009, 12 pages.
U.S. Appl. 11/183,167 Office Action dated Jun. 23, 2009, 19 pages.
U.S. Appl. 11/183,167 Final Office Action dated Jan. 5, 2010, 18 pages.

* cited by examiner

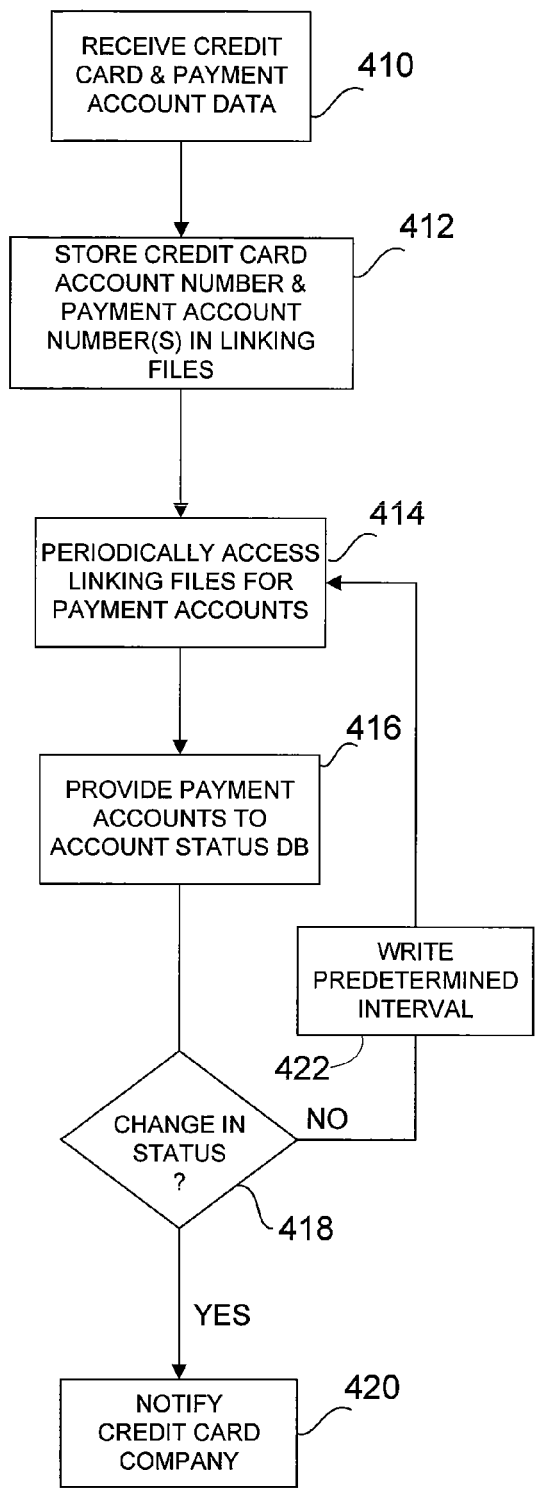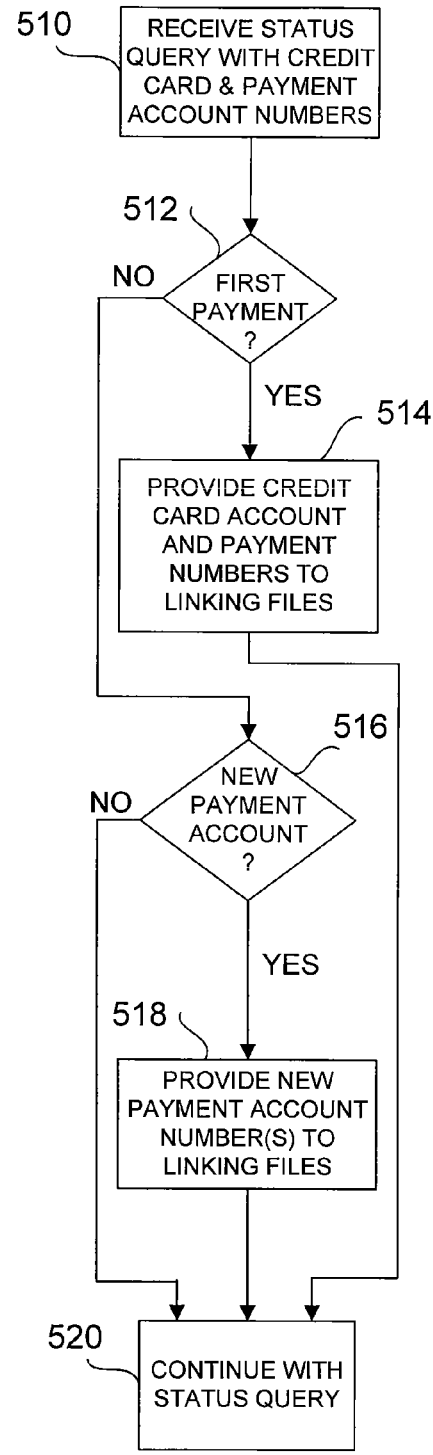
FIG. 4
FIG. 5

US 7,958,050 B2

PAYMENT ACCOUNT MONITORING SYSTEM AND METHOD

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Creditors are faced with various issues when processing payments from their customers. One such issue is the inherent delay when processing payment checks. As an example, a credit card company may receive a payment check, but until the check is cleared through the banking system, the card company may not know if the account is good or there are sufficient finds to cover the check.

Fraudulent schemes have been devised to take advantage of the delay between a check being received and a check being cleared for payment by a bank. One such scheme is sometimes referred to as "bust out fraud." A person with a credit card account makes payment by check, but the check is drawn against an account that is known (by the cardholder) to be closed or to have insufficient funds. A credit card company may post the check (before it is presented to the paying bank) and restore some or all of the credit card limit. The cardholder then quickly makes additional purchases. Before the credit card company receives notification from the bank that the check has not cleared, the cardholder may in fact have made numerous purchases (and possibly sent in several more bad checks) before the scheme is uncovered.

While credit card companies may attempt to stem losses from such schemes by suspending a payment credit until a check clears, such a practice penalizes honest cardholders and prevents them from fully using their card account until the check clears. This may give rise to frustration on the part of the cardholder, and also reduced card use (and reduced revenue for the credit card company).

Solutions have been adopted for minimizing some of these difficulties by providing up-to-date account status to creditors when a payment (such as a check) is received. For example, the remittance risk service provided by Early Warning Services, LLC, Scottsdale, Ariz., provides notice to banks, creditors and payment processors of account status when checks are deposited or used for payment. A database stores current information on checking and similar accounts at most U.S. banks, so that upon receipt of a check, the recipient may electronically access the database and immediately determine the status of the account against which the check is drawn. Checks drawn against accounts that have been closed or have some other questionable status may be flagged for further investigation or rejection (i.e., posting a credit payment may be delayed or refused).

While such services may reduce the risk from fraudulent check schemes, it does not eliminate burden to the creditor (e.g., in following up on flagged accounts), or the possible negative customer impact if the flagged account is questionable for reasons other than fraudulent activity by the customer. For example, a trustworthy customer himself or herself may have been the victim of fraudulent activity (e.g., identity theft), and the creditor and customer may both need to investigate reasons for a flagged, high-risk status. Or, when payment to a creditor is in the form an automatic monthly draft against an account using the ACH (automated clearing house) system, a customer may have closed an account without remembering to change the payment authorization to a new account. Receiving notification of refusal to honor a payment (or having fees automatically assessed for a payment being rejected) may lead to hard feelings on the part of a valued customer, and result in loss of customer goodwill.

BRIEF SUMMARY OF THE INVENTION

There is provided, in accordance with embodiments of the present invention, a system and method for maintaining a status database on payment accounts used for making recurring payments to recipient (e.g., creditor) accounts, and periodically accessing the database in advance of payment due dates. Notice (in advance of a due date) of a negative status or of a change in status is provided to the recipient.

In one embodiment, a method for monitoring the status of payment accounts includes providing a status database for storing status information on payment accounts, updating the status database if there is a change in status information for the payment accounts, storing data at a monitoring file that links identifying data for at least one recipient account (e.g., creditor account) to data identifying one or more payment accounts, and using the monitoring file to periodically access the status database prior to the due date for payments to be made to the recipient account. The recipient (creditor) may be notified of the status or a change in status of the payment account.

A more complete understanding of the present invention may be derived by referring to the detailed description of the invention and to the claims, when considered in connection with the Figures.

BRIEF DESCRIPTION OF THE DRAWINGS

FIG. 4 is a flow diagram illustrating the operation of the monitoring system.

FIG. 5 is a flow diagram illustrating the operation of the monitoring system, when storing linked creditor account data and associated payment account data.

DETAILED DESCRIPTION OF THE INVENTION

Embodiments of the invention enable a creditor or other recipient of recurring payments to receive advance notice concerning the status of a payment account used by customers to make payment to another account (e.g., a creditor account). In the illustrated embodiments, the creditor account is a credit card account and the payment account is a checking account. However, it should be appreciated that the invention has application to any type of payee account (e.g., accounts for car loans, mortgages, bank loans, merchants, utility companies, and so forth) to which recurring payments are made from another account (e.g., checking, savings, stored value, credit, debit, and brokerage accounts) by a consumer, customer or other payer.

Figure 1:
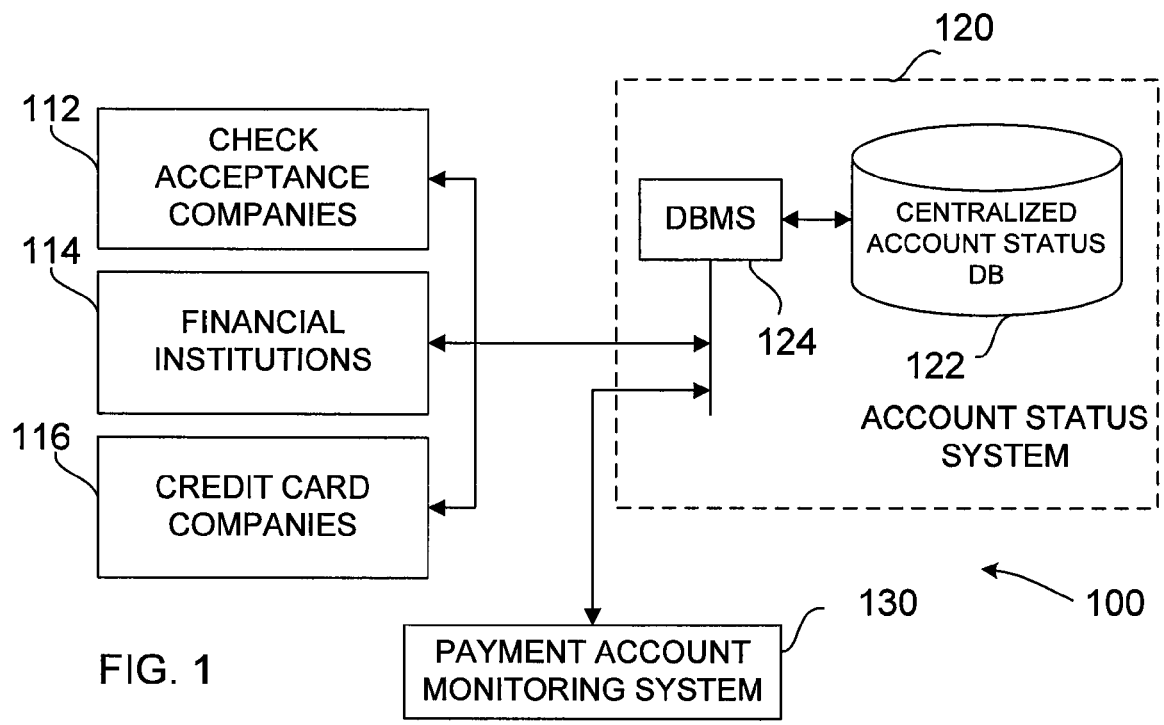
FIG. 1 is a block diagram illustrating a network having a payment account monitoring system according to one embodiment of the invention.

Referring to FIG. 1, there is illustrated a financial network 100 in accordance with one embodiment of the invention. In the network 100, payments made by consumers or customers may be received by check acceptance companies 112, financial institutions 114 and credit card companies 116. The check acceptance companies 112 may be used by retailers and other entities that receive checks from customers, for purposes of processing and guaranteeing payment on those customer-tendered checks. The financial institutions 114 (e.g., banks) may have checks tendered by customers for deposit, loan payment or similar purposes. The credit card companies 116 (e.g., a card issuer or an entity processing payments on behalf of an issuer) may have checks tendered as payment and to be applied against balances on credit card accounts.

Payments in the form of checks may result in the status of the underlying payment account (the checking account against which the check is drawn) being determined or checked at an account status system 120. The account status system 120 includes a centralized account status database 122 for storing information (such as status codes) pertaining to the checking account, and a database management system (DBMS) 124 for managing the storage, access, updating and maintenance of data in database 122. The database 122 stores status information on large numbers of accounts. The status may correspond to certain negative transactions or events that occur in connection which each account, such as it being closed (either by the account holder, or by a bank for unacceptable account holder activity), having a stop order in effect, having checks returned for insufficient funds, and so forth. The account status system 120 may be of the type operated by Early Warning Services, LLC, Scottsdale, Ariz., in which participating banks provide status information on a daily basis to the database 122 for each checking account maintained by the participating bank. In addition, the participating banks provide information on accounts maintained by other, non-participating banks, where such information is available, such as a check returned by a non-participating bank to a participating bank for various reasons—insufficient funds, closing of the account and so forth. Since individual banks frequently process items (checks, ACH transfers, etc.) from many other banks (e.g., for deposits and the like), the reporting of account status by several large participating banks for both their own accounts as well as accounts managed by other banks (for which they have received checks), results in a database having account status for most checking accounts that might be used for making deposits or payments.

When a check is received by a check acceptance company 112 (e.g., from one of its retailers), by a financial institution 114, and by a credit card company 116, each of those entities may request (electronically, and on a real time basis) the status of the underlying checking account by transmitting the account number for the check to DBMS 124. DBMS 124 queries the database 122 for the status of the account, and returns that information to the entity requesting the information. Thus the entity receiving the check knows (at or very close to the time of receipt) if the account is closed or has had activity that indicates the check may not clear when presented to the financial institution maintaining the account. The following table provides representative codes that can be stored relating to specified status or specified account conditions. Based on the code, the entity making the request may decide to refuse the check, to suspend posting until further investigated, or to post the amount of the payment to its records.

TABLE OF CHECKING ACCOUNT STATUS CODES

| Code | Name | Definition |
| --- | --- | --- |
| 00 | Not Located | Account requested for verification does not exist on the contributor's master account file. This condition may indicate an account number misread or a potentially fraudulent item. |
| 02 | Closed for Cause | A transaction account which has been closed by the contributing institution as a result of unacceptable use by the customer. |
| 04 | Stop Payment | A check inquiry (transit item) where all MCR fields match a stop payment record. |
| 10 | Post No Debits | Account will not accept any debit activity. |
| 12 | Closed | Account is closed. |
| 15 | Return Account | An account that has returned items over the past ten days. |
| 20 | NSF | Available balance is equal to or less than zero. |
| 99 | Open Valid | Account is present on the contributor's master account file and does not contain a negative status at the time of inquiry. |

It should be appreciated that the above codes are illustrative only, and that other status codes may be stored in database 122. In addition, the DBMS 124 may use transaction history to calculate a rank or rating for the "risk of return" for a check or other payment. Based on the risk associated with a payment account, the creditor may decide whether or not to post the payment to the creditor account.

Further, while status codes are illustrated as pertaining to the likelihood of the account having funds for payment, other events may be reflected in the status codes. Examples include (but are not limited to) a change in the account holder address (which might be of concern to a mortgagee, for example), a probate court hold on the account because of an account holder's death, and an increase in the number of or some other change relating to, the named account holders or authorized signatories (indicating possible fraud or suspicious activity).

In accordance with one embodiment, there is further provided in the network 100 a payment account monitoring system 130 that operates in conjunction with the account status system 120.

The monitoring system 130 provides significant advantages to those entities receiving checks and other recurring payments (e.g., entities 112, 114 and 116) by enabling the payment-receiving entities to receive advance information on the status of payment accounts, i.e., information in advance of the date payment is received. As will be more fully described below, the monitoring system 130 checks the account status system 120 (independently of receipt of checks or other payments) to determine whether there has been a change in status (e.g., a new or changed status that might impact or affect the availability of the payment account to make payment when due). Such features are implemented by the monitoring system 130 using the payment account(s) previously known to be used by the customer for recurring payments, and periodically (e.g., daily) checking those accounts for the status. A negative status (i.e., one affecting the likelihood of a check or payment being returned or refused) is brought to the attention of the creditor, permitting (in most cases) the creditor to investigate the negative status well before the payment due date.

Figure 2:
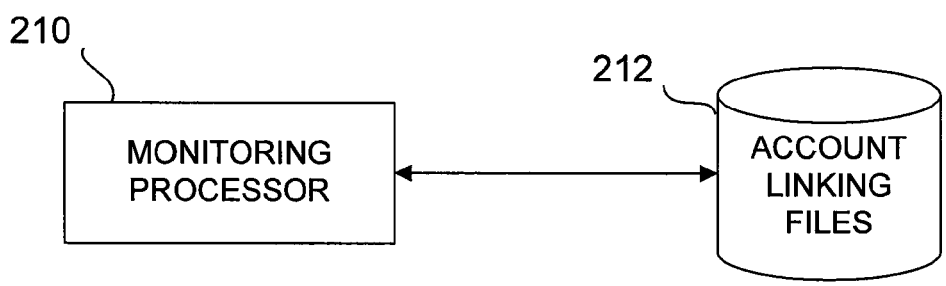
FIG. 2 illustrates in greater detail the monitoring system seen in the network of FIG. 1.
Figure 3:
FIG. 3 illustrates account identifying data for a creditor account and for associated customer payment accounts, stored in the account linking files database of the monitoring system.

FIGS. 2 and 3 illustrate in greater detail the monitoring system 130 and the data stored therein. As seen, the system 130 includes a monitoring processor 210 and linking files or database 212. The data stored in the linking files 212 for an exemplary credit card account is seen in FIG. 3. For the exemplary credit card account, the credit card account number is associated with two payment accounts (checking accounts) that have been previously used by the credit card holder to make payments to the credit card account. While two payment accounts are illustrated, it should be appreciated that there could be any number of accounts used by the cardholder. In many cases, only a single payment account will be used by the cardholder and stored in the linking files. In other cases, a cardholder may use more than two payment accounts.

The linking files 212 may optionally have a "previous payment" field 320, the purpose of which will be described later in conjunction with FIG. 5.

The monitoring processor 210 is programmed to periodically access the files 212 for each credit card account number on a daily basis (or other frequency chosen by the card company), retrieve the payment account(s) associated with that credit card account, and process a query to the account status system 120 for the status of the account. In some cases, if a status other than "open and valid" is returned by the account status system 120, then an alert is sent from the account monitoring system to the creditor. In other embodiments (not shown), the linking files may also store the status resulting from a previous query to the account status system 120, and if there is any change (particularly any change from a previous status to a new, higher-risk status), then an alert may be sent to the credit card company 116.

FIG. 4 illustrates program steps for carrying out functions as described above and programmed within the monitoring system 130. In FIG. 4, the monitoring system 130 initially receives (step 410) the credit card account number (or other credit card identifying data) and the payment account number (checking account or other identifying data) from the credit card company (e.g., the card issuer). In one embodiment, this may be done at the time the account is opened by the cardholder, and it may be subsequently updated from time-to-time (e.g., automatically when the card company receives a payment check drawn from a different account, or by the card company if notified by the cardholder that a different account will be used in the future). An alternative embodiment for storing data in linking files 212 will be described later in conjunction with FIG. 5. As mentioned earlier, there may be one or more payment accounts identified and associated with the credit card account number in the linking files 212.

The credit card account number and the associated payment account number(s) are stored at linking files 212 (step 412). Thereafter, the monitoring processor accesses the linking files at predetermined intervals to retrieve (for each credit card account) payment account numbers (step 414), and provides those account numbers to database 122 (through DBMS 124) in order to get the status code for each such account (step 416). If there has been a change in the status code (step 418), such as a change reflecting a higher risk level, the monitoring system notifies the credit card company 116 (step 420). If there had been no change in status, the monitoring system waits a predetermined interval (step 422) and again accesses the linking files for payment account numbers at step 414.

The frequency with which the monitoring system accesses status database 122 (e.g., at step 422) may depend on parameters provided by the credit card company 116. For example, the monitoring system may check status database 122 daily, and report any high risk status codes or any negative changes in codes to the affected credit card company. Such an interval provides the greatest potential lead time between a creditor uncovering status code problems and the date for payment. However, the periodic status checks may be less or more frequent, may be based on certain conditions (e.g., a predetermined period before the due date), or may be triggered by certain events (e.g., unusual credit card activity). Data reflecting such parameters, conditions or events (that may determine the timing or frequency of status checks) may be stored in the linking files 212 (not illustrated in FIG. 3).

The response of the credit card company to an alert from monitoring system 130 may depend upon the circumstances. For example, a closed account status (closed by the account holder, with the existence of another, "open and valid" payment account for the same credit card) may lead to no action by the credit card company, whereas a closed account "for cause" (resulting from improper transactions by the account holder) may lead to a call to the account holder to determine the reasons for the closure, and possibly a suspension of credit to the card holder. Also, the response of the credit card company may be dictated by recognized good business practices, or by banking or financial regulations (e.g., regulations controlling whether payment may or may not be refused).

FIG. 5 illustrates an embodiment of the invention where payments to the credit card company are used to set up or update account data at the linking files 212. This embodiment may be implemented by programming resident at the payment processing system of the credit card company, at the monitoring system 130, or at the account status system 120. However, in the specific method steps illustrated in FIG. 5, the programming is largely resident at the DBMS 124 of the system 120, and is initiated when a credit card company receives a payment check and queries the status system 120 for the status of the account against which the check is drawn (step 510), by providing both the credit card account number and the customer checking account number.

The DBMS 124 first determines if the payment is the first payment that has been made to the account at step 512. This step may be accomplished in several ways, but in one embodiment the DBMS 124 responds to a status query by checking (via monitoring processor 210) data field 320 (FIG. 3) associated with linking files 212, such data field storing a flag that indicates whether or not the credit card account has ever had a payment made. Alternatively, this flag could also be stored (and checked) at the payment system of the credit card company 116.

If it is the first payment, then the credit card account number and checking account number are provided (step 514) to monitoring system 130 and stored at the linking files 212 (the flag in previous payment field 320 is set to "yes"), and the process for updating the linking files 212 (as to this particular credit card account) ends. If it is not the first payment, then the DBMS 124 compares the payment account being used for payment to the payment account stored in the linking files 212, to determine if it is a new payment account—i.e., not previously used (step 516). If it is a new account, then the new payment account number is added to the linking files (step 518) as one of the payment accounts for that credit card (so that it can be periodically checked in the future, in accordance with the steps illustrated in FIG. 4). After the payment account is updated, the monitoring system continues with the status check of the account at the status database 122 for the payment being made (step 520).

While FIG. 5 illustrates credit card and payment (checking) account numbers being provided at payment time in order to update linked account data, the credit card company could provide the linked account data independently of payments, e.g., provide each credit card account number and its linked payment account in batch form periodically, such as once a month.

While not illustrated in the drawings, the form of payment made using the payment account need not be a check. For example, the payment may be in the form of an ACH or other automatic electronic transfer through the banking system linking the banks of customers and creditors. Embodiments of the invention have usefulness in such a payment arrangement, since the creditor may use notice of a payment account being closed prior to the date the ACH transfer is attempted in order to avoid the extra work and the possible loss of customer satisfaction resulting from a payment refusal or assessment of late payment charges to an otherwise trustworthy customer who forgets to notify the creditor of an account change.

It can be seen from the preceding discussion that the present invention provides a novel method and system for providing advance notice of status information for payment accounts. While detailed descriptions of presently preferred embodiments of the invention have been given above, various alternatives, modifications, and equivalents will be apparent to those skilled in the art without varying from the spirit of the invention. For example, the processes seen in FIGS. 4 and 5 are but examples of processes that may be implemented in the network 100. In other embodiments, steps may be added, some steps may be omitted, and the order of the steps may be changed. As a further example, while the monitoring system 130 is seen in the network 100 as separate from the account status system 120, it could in fact be part of the system 120, with linking files 212 being incorporated into database 122 and/or monitoring processor 210 being incorporated into DBMS 124.

Therefore, the above description should not be taken as limiting the scope of the invention, which is defined by the appended claims.

What is claimed is:

1. A computerized method for monitoring the status of a payment account against which a recurring payment has been drawn, via a monitoring file which is continuously updated as payments are made to a recipient by a payer, the method comprising:

providing, as part of a computer system, a status database that stores status information on payment accounts, the status information comprising an account status and/or an account condition associated with each of the payment accounts, the status database operated by or on behalf of an entity other than the recipient or the payer;

updating the status database in the computer system if there is a change in the status information for any of the payment accounts;

providing, as part of the computer system, a monitoring file that stores a plurality of recipient account numbers and a plurality of payment account numbers, and that associates at least one of the plurality of recipient account numbers to at least one of the plurality of payment account numbers;

receiving, at the computer system, a recipient account number and a payment account number from the recipient in response to a payment toward a recurring payment from the payer to the recipient;

updating the monitoring file, via the computer system, by comparing the received payment account number to any payment account numbers previously stored in association with the received recipient account number in the monitoring file and by storing the received payment account number in association with the received recipient account number in the monitoring file if the received payment account number is a new payment account number; and subsequent to and independently of said updating of the monitoring file to periodically accessing, via the status database of the computer system, the status information using any payment accounts numbers stored in association with any recipient account number of the plurality of recipient account numbers in the updated monitoring file, wherein said periodic access occurs prior to a due date for an expected recurring payment and before a date on which the expected recurring payment is made on said any recipient account number, so that notification can be sent to the recipient if the status information has changed for said any payment account numbers stored in association with said any recipient account number in the updated monitoring file.

2. The method of claim 1, wherein said any recipient account number is a creditor account number.

3. The method of claim 2, further comprising: notifying the creditor of a change in status information if the status information has changed for said any payment account numbers stored in association with said creditor account number.

4. The method of claim 2, wherein the creditor account number is a credit card account number.

5. The method of claim 2, wherein the creditor account number is a loan account number to which ACH transfers are made from said any payment account numbers stored in association with the loan account number.

6. The method of claim 2, wherein a checking account number is stored in association with said creditor account number as one of said any payment account numbers.

7. The method of claim 2, further comprising:

determining whether the status information for said any periodically accessed payment account numbers has been updated to reflect a change in status information; and notifying the creditor if there has been a change in the status information, so that the creditor is aware of the change in status information before the due date of the expected recurring payment.

8. The method of claim 1, wherein the updating of the status database is periodic.

9. The method of claim 8, wherein periodic is daily.

10. The method of claim 1, wherein the status database is updated by receiving from participating banks a current status of each of the payment accounts maintained at said participating banks.

11. The method of claim 10, wherein the status database is further updated by requesting the participating banks provide the current status of the payment accounts maintained by other banks which have had items returned when drawn against the payment accounts of said other banks.

12. The method of claim 1, wherein said periodic access occurs daily using the updated monitoring file.

13. The method of claim 1, wherein said periodic access is based on condition data stored in the monitoring file.

14. The method of claim 13, wherein the condition data is based on the due date associated with the expected recurring payment to be made on said any recipient account number.

15. The method of claim 1, wherein the status information comprises one or more of the following:

open and valid;

closed;

has had checks returned for insufficient funds;
has had a change in the account address;
and
has had a change relating to account holders.

16. The method of claim 1, wherein said updating the monitoring file further includes periodically receiving batched linking data from the recipient, the batched linking data including a plurality of recipient account numbers and one or more payment account numbers linked to each of said plurality of recipient account numbers.

17. The method of claim 1, further comprising storing the received payment account number in association with the received recipient account number in the monitoring file when the payment is a first payment being made by the payer to the recipient on the received recipient account number.

18. A computer system for monitoring the status of payment accounts against which recurring payments have been drawn, via a monitoring file which is continuously updated as payments are made by a payer for the benefit of a creditor, the system comprising:
a status database, on a storage medium of an account status system, that stores status information on payment accounts, the status information comprising an account status and/or an account condition associated with each of the payment accounts, the status database operated by or on behalf of an entity other than the payer or the creditor;
a monitoring file, on a storage medium of a monitoring system, that associates at least one creditor account identifier to at least one payment account identifier, wherein the association between the at least one creditor account identifier and the at least one payment account identifier is updated when a creditor account identifier and a payment account identifier are received by the monitoring system in response to a payment toward a recurring payment from the payer to the creditor and when a comparison of the received payment account identifier to any payment account identifiers previously stored in association with the received creditor account identifier indicates that the received payment account identifier is a new payment account identifier, said update including storing the received payment account identifier in association with the received creditor account identifier in the monitoring file and a processor configured to periodically access, via the status database, the status information using any payment account identifiers stored in association with any creditor account identifier of the at least one creditor account identifier in the updated monitoring file, wherein said periodic access occurs subsequent to and independently of said update to the monitoring file, prior to a due date for an expected recurring payment and before a date on which the expected recurring payment is made on said any creditor account identifier, so that notification can be sent to the creditor if the status information has changed for said any payment account identifiers stored in association with said any creditor account identifier in the updated monitoring file.

19. The system of claim 18, wherein said any creditor account identifier is a credit card account identifier, and the creditor is a credit card company managing the credit card account identifier.

20. The system of claim 18, wherein said any creditor account identifier is a loan account identifier to which ACH transfers are made from said any payment account identifiers stored in association with the loan account identifier.

21. The system of claim 18, wherein a checking account identifier is stored in association with said any creditor account identifier as one of said any payment account identifiers.

22. The system of claim 18, wherein the processor is further configured to provide any accessed status information to the creditor.

23. The system of claim 18, wherein the processor is further configured to:
determine whether the status information for said any periodically accessed payment account identifiers has been updated to reflect a change in status information; and
notify the creditor if there has been a change in the status information, so that the creditor is aware of the change in the status information before the due date of the expected recurring payment.

24. The system of claim 18, further comprising a database management system configured to update the status database periodically.

25. The system of claim 24, wherein periodically is daily.

26. The system of claim 18, further comprising a database management system configured to update the status database in response to receiving from participating banks a current status of each of the payment accounts maintained at said participating banks.

27. The system of claim 26, wherein the database management system is further configured to update the status database in response to requesting the participating banks provide the current status of the payment accounts maintained by other banks which have had payment refused for checks drawn against the payment accounts of said other banks.

28. The system of claim 27, wherein said periodic access occurs daily using the updated monitoring file.

29. The system of claim 18, wherein said periodic access is based on condition data stored in the monitoring file.

30. The system of claim 29, wherein the condition data is based on the due date associated with the expected recurring payment to be made on said any creditor account identifier.

31. The system of claim 18, further comprising a database management system configured to update the status database with status information comprising one or more of the following:
open and valid;
closed;
has had checks returned for insufficient funds;
has had a change in the account address;
and
has had a change relating to account holders.

* * * * *